US008095552B2

(12) United States Patent
Sivakumar et al.

(10) Patent No.: US 8,095,552 B2
(45) Date of Patent: Jan. 10, 2012

(54) DATA TAG DESCRIPTOR

(75) Inventors: Gandhi Sivakumar, Bangalore (IN); VijayaGanesh Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 12/502,456

(22) Filed: Jul. 14, 2009

(65) Prior Publication Data

US 2011/0016103 A1    Jan. 20, 2011

(51) Int. Cl.
*G06F 17/30* (2006.01)
(52) U.S. Cl. .......................... 707/758; 707/706; 707/802
(58) Field of Classification Search .......... 709/217–219; 707/705–796, 912–916, 802; 725/4–5; 705/901–912
See application file for complete search history.

(56) References Cited

U.S. PATENT DOCUMENTS

| | | | |
|---|---|---|---|
| 6,535,509 B2 | 3/2003 | Amicangioli | |
| 6,671,732 B1 | 12/2003 | Weiner | |
| 7,085,845 B2 | 8/2006 | Woodward et al. | |
| 7,136,866 B2 * | 11/2006 | Springer et al. | 1/1 |
| 7,581,217 B2 * | 8/2009 | Jhanwar et al. | 717/168 |
| 7,706,637 B2 * | 4/2010 | Marriott | 382/305 |
| 7,792,865 B2 * | 9/2010 | Hamada et al. | 707/796 |
| 7,856,373 B2 * | 12/2010 | Ullah | 705/7.29 |
| 2004/0068532 A1 * | 4/2004 | Dewing et al. | 709/200 |
| 2004/0215635 A1 * | 10/2004 | Chang et al. | 707/100 |
| 2005/0015713 A1 * | 1/2005 | Plastina et al. | 715/500.1 |
| 2005/0080788 A1 * | 4/2005 | Murata | 707/10 |
| 2007/0156726 A1 * | 7/2007 | Levy | 707/100 |
| 2007/0226365 A1 * | 9/2007 | Hildreth et al. | 709/231 |
| 2007/0250560 A1 * | 10/2007 | Wein et al. | 709/201 |
| 2008/0052698 A1 * | 2/2008 | Olson et al. | 717/168 |
| 2008/0071725 A1 * | 3/2008 | Raskin et al. | 707/1 |
| 2008/0275960 A1 * | 11/2008 | Myllyla et al. | 709/217 |
| 2009/0328120 A1 * | 12/2009 | Finger et al. | 725/110 |
| 2010/0076994 A1 * | 3/2010 | Soroca et al. | 707/769 |

* cited by examiner

*Primary Examiner* — Shahid Alam
*Assistant Examiner* — Evan Aspinwall
(74) *Attorney, Agent, or Firm* — Schmeiser, Olsen & Watts; John Pivnichny

(57) ABSTRACT

A data tag descriptor method and system. The method includes generating by a device, a request for media data. The device generates a globally unique data tag specifying hardware and software capabilities of the device and a transmission package comprising the request and the globally unique data tag. The device transmits the transmission package to a service provider. The service provider determines based comparing the globally unique data tag to a media tag associated with metadata describing the media data if the media data is compatible with the capabilities of the device. The device receives executable media data from the service provider. The executable media data comprises a specified form of the media data. The executable media data is generated based on results of determining if the media data is compatible with the capabilities of said device. The device executes the executable media data for a user.

18 Claims, 5 Drawing Sheets

DATA TAG DESCRIPTOR

FIELD OF THE INVENTION

The present invention relates to a method and associated system for tagging metadata associated with media data and tagging devices to determine capability matches between various devices and the media data.

BACKGROUND OF THE INVENTION

Determining data type for transmission to a user typically comprises an inefficient process with little flexibility. Accordingly, there exists a need in the art to overcome at least some of the deficiencies and limitations described herein above.

SUMMARY OF THE INVENTION

The present invention provides a method comprising:
generating, by a device, a request for media data;
generating, by said device, a globally unique data tag specifying capabilities of said device;
generating, by said device, a transmission package comprising said request and said globally unique data tag;
transmitting, by said device to a service provider, said transmission package, wherein said service provider enables a controller device comprising a memory unit storing a media mapping and adaptation table that includes device tags, media tags, URL tags, adapted media tags, adaptation service tags, and additional device tags, wherein said service provider determines that said media data is not compatible with said hardware and software capabilities of said device based on comparing said globally unique data tag to a media tag of said media tags and a URL tag of said URL tags, wherein said media tag and said URL tag describe meta data associated with said media data, wherein said media data comprises a first format differing from an original format comprised by said media data, wherein a search is performed within said mapping and adaptation table for an adaptation service tag of said adaptation service tags to locate an appropriate service for converting the media data to a compatible format, wherein the media data is converted to executable media data comprising said compatible format, and wherein said executable media data is tagged with an adapted media tag of said adapted media tags;
receiving, by said device from said service provider, said executable media data comprising a specified form of said media data, wherein said executable media data is generated based on results of said comparing said globally unique data tag to said media tag of said media tags and said URL tag of said URL tags; and
executing, by said device for a user, said executable media data.

The present invention provides a method comprising:
generating, by a service provider controller device, a subscription to a content repository, wherein said subscription is associated with a means for connecting to said content repository, wherein said subscription is associated with a media device belonging to a user and a topic of interest associated with said user, and wherein said service provider controller device comprises a memory unit storing a media mapping and adaptation table that includes device tags, media tags, URL tags, adapted media tags, adaptation service tags, and additional device tags;
automatically receiving, by said service provider controller device, media data associated with said subscription, wherein said media data comprises a globally unique media tag of said media tags and a URL tag of said URL tags associated with metadata specifying characteristics of said media data;
reading, by said service provider controller device, said globally unique media tag and said URL tag;
comparing, by said service provider controller device in response to said reading, said globally unique media tag and said URL tag to a data tag specifying hardware and software capabilities of said media device;
determining, by said service provider controller device in response to said comparing, that said characteristics of said media data are not compatible with said capabilities of said media device;
searching, within said mapping and adaptation table by said service provider controller device, for an adaptation service tag of said adaptation service tags, wherein said adaptation service tag is associated with an appropriate service for converting the media data to a compatible format;
locating, by said service provider controller device in response to said results of said searching, said appropriate service;
converting, by said service provider controller device, said media data into executable media data, wherein said executable media data comprises said compatible format differing from an original format comprised by said media data;
tagging, by said service provider controller device said executable media data with an adapted media tag of said adapted media tags; and
transmitting, by said service provider controller device to said media device, said executable media data comprising a specified form of said media data.

The present invention advantageously provides a simple method and associated system capable of identifying data for presenting to a user.

DETAILED DESCRIPTION OF THE INVENTION

Figure 1:
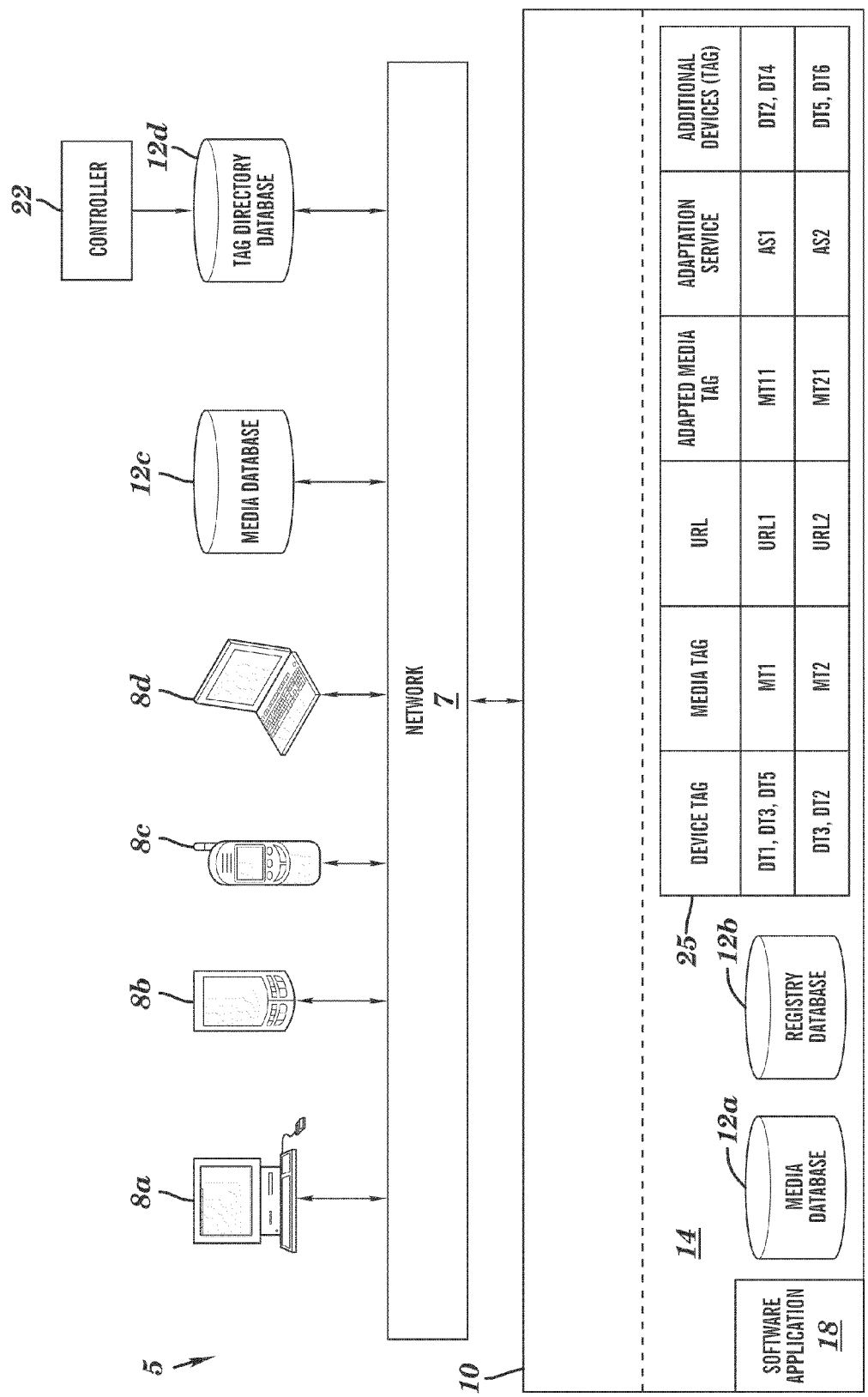
FIG. 1 illustrates a system for generating for tagging metadata associated with media data and tagging devices to determine capability matches between various devices and the media data, in accordance with embodiments of the present invention.

FIG. 1 illustrates a system 5 for generating for tagging metadata associated with media data and tagging devices to determine capability matches between various devices and the media data, in accordance with embodiments of the present invention. A tag apparatus (e.g., an intelligent multimedia tag plug-in) tags capabilities of a media device and/or media data (i.e., meta associated with the media data) and encapsulates media data capabilities. The tag apparatus may comprise any combination of hardware and/or software. The tag apparatus resides in a device (e.g., devices 8a ... 8d) and/or a media data repository. Additionally, a tags directory (i.e., comprising a listing for multimedia tags) may be published in a publicly available directory (e.g., tags directory database 12d). A data tag (e.g., a multimedia tag, a globally unique data tag, etc) may be abstracted as coarse or fine grained descriptions. All primitives involved in a media stream flow may use the multimedia tag and wrap the message. Upon receipt of a request comprising a data tag, a controller (e.g., within computing system 10) may directly perform a data tag match and route the request to an appropriate service thus improving latency in time crucial multimedia streams. In service oriented architecture (SOA), the data tag may be viewed as another dimension inclined towards coupling (e.g., protocol and time) between the service provider and service consumers. Every service created for handling media will comprise an associated data tag. The data tag is universally unique for characteristics of a service repurposing media. The data tag will be hosted in a service registry instead of a text based description. Every user will carry media characteristics for their media device consolidated as a data tag. When a controller connects to a media device, it picks up the data tag, performs a tag match (i.e., to a media tag associated with metadata describing media data) in a media mapping and adaptation table/media service registry, and routes the call to an appropriate service. The data tag comprises a globally (universally) unique tag for defining media characteristics/device capabilities of a media device.

System 5 of FIG. 1 comprises media devices 8a ... 8d (i.e., user multimedia devices comprising data tags), a tag directory database 12d (and a controller 22), and a content database 12c connected to a computing system 10 (i.e., a service provider system) through a network 7. Media devices 8a ... 8d may comprise any type of media device (e.g., a computer, a notebook computer, a personal digital assistant, a cellular telephone, a media player (e.g., an MP3 player), a music player, a video player, etc) capable of storing and executing multimedia data (e.g., audio files, video files, data files, compressed files, etc). Network 7 may comprise any type of network including, inter alia, a local area network, (LAN), a wide area network (WAN), the Internet, etc. Media database 12c comprises media data (e.g., audio, video, data, etc) available for uploading to media devices 8a ... 8d. Media database 12c may comprise a single database (i.e., as illustrated) or a plurality of databases associated with a plurality of different entities supplying media data. Tag directory database 12d is used to store a plurality of publically available tags describing capabilities of a plurality of media devices and/or tags describing metadata associated with media data. Controller 22 is used to generate new tags describing capabilities of a plurality of media devices and/or tags describing metadata associated with media data. Computing system 10 may comprise any type of computing system(s) including, inter alia, a personal computer (PC), a server computer, a database computer, etc. Computing system 10 may comprise a single computing system or a plurality of computing systems. Computing system 10 is used to perform a process for retrieving data tags from media devices 8a ... 8d and comparing the data tags to media tags associated with metadata describing media data in order to locate media data that is compatible with an associated media device (i.e., one of media devices 8a ... 8d). Computing system 10 comprises a memory system 14. Memory system 14 may comprise a single memory system. Alternatively, memory system 14 may comprise a plurality of memory systems. Memory system 14 comprises a software application 18, databases 12a and 12b, and a table 25 (i.e., a media mapping and adaptation table). Media database 12a comprises media data (e.g., audio, video, data, etc) available for uploading to media devices 8a ... 8d. Registry database 12b comprises service details (i.e., comprising service based Tags). Media mapping and adaptation table 25 may be hosted in database 12a. Databases 12a and 12b may comprise a single database or a plurality of databases. Databases 12a and 12b may be located internal to computing system 10 (i.e., as illustrated in FIG. 1) or external to computing system 10.

Multimedia stream flow (i.e., for multimedia data) from the service provider (via computing system 10) to the user (via media devices 8a ... 8d) may be executed as a pull based model or a push based model.

A pull based model in executed when a user requests specified media data. Software application 18 executes the following steps (i.e., using table 25) associated with a pull based model:

1. One of media devices 8a ... 8d (e.g., a mobile phone, a hand held device, a PC, a transcoder engine, a watermarking engine, a media processing engine, etc) transmits a media request to a service provider/digital content provider (e.g., computing system 10).
2. A tag apparatus (e.g., an intelligent multimedia tag plug-in) residing in the media device converts the capabilities of the media device with a globally unique data tag.
3. The request is combined with the globally unique data tag and transmitted to the service provider/digital content provider domain.
4. A controller associated with the service provider/digital content provider parses the globally unique data tag and determines capabilities of the media device. For example, a media device with capabilities tagged as DT1 (i.e., from table 25) has requested media data identified as a unique URL (e.g., URL1). When the request reaches the controller, the controller performs a match in the media device to a media mapping and adaptation table (i.e., table 25).
5. If the media data identified as MT1 of URL1 comprises capabilities (i.e., metadata) tagged as DT1, DT3, DT5, then the media data available is compatible (i.e., there is no need to perform a conversion) and the controller pushes the media data identified as MT1 to the media device.
6. If the media device is identified with a tag DT2 and requests media data identified as MT1, the media data must be converted into a compatible format for the media device. A controller (e.g., computing system 10) performs an extended search in the media mapping and adaptation table to determine a relevant service. In this case AS1 is the service which will perform a conversion and the converted MT1 becomes MT11 to be pushed to DT2. The controller invokes AS1 which pulls the media data from a media repository, performs the conversion, and is tagged as MT11 which will be handed over to the controller. The controller pushes the adapted media to the media device identified as DT2.

In a push based model, a requester normally subscribes to media data services based on specified characteristics. Software application 18 executes the following steps (i.e., using table 25) associated with a push based model:

1. A content interested party (e.g., a user media device or a service provider) subscribes to a content repository (e.g., public) based on topics of interest (e.g., media associated with animal topics).

In this case when media data is uploaded in a repository (e.g., media database 12c) and automatic scripts trigger a process to push the media data to relevant subscribed parties.

2. A tag apparatus (e.g., an intelligent multimedia tag plug-in) residing in a content repository converts characteristics of the media data into a globally unique data tag and tags the media data before pushing the media data to the subscribed parties.
3. A controller reads the globally unique data tag to determine characteristics of the media data.
4. The controller compares a media device (i.e., a data tag for the media device) to a media mapping and adaptation table (i.e., table 25).
5. For example, if media data identified as MT2 is compatible with media devices DT3 and DT2, the controller pushes the media data identified as MT2 to the devices DT3 and DT2.
6. If the media device profile is not available in the media mapping and adaptation table (i.e., for devices DT5 and DT6), the media data is converted to MT21.

Figure 2:
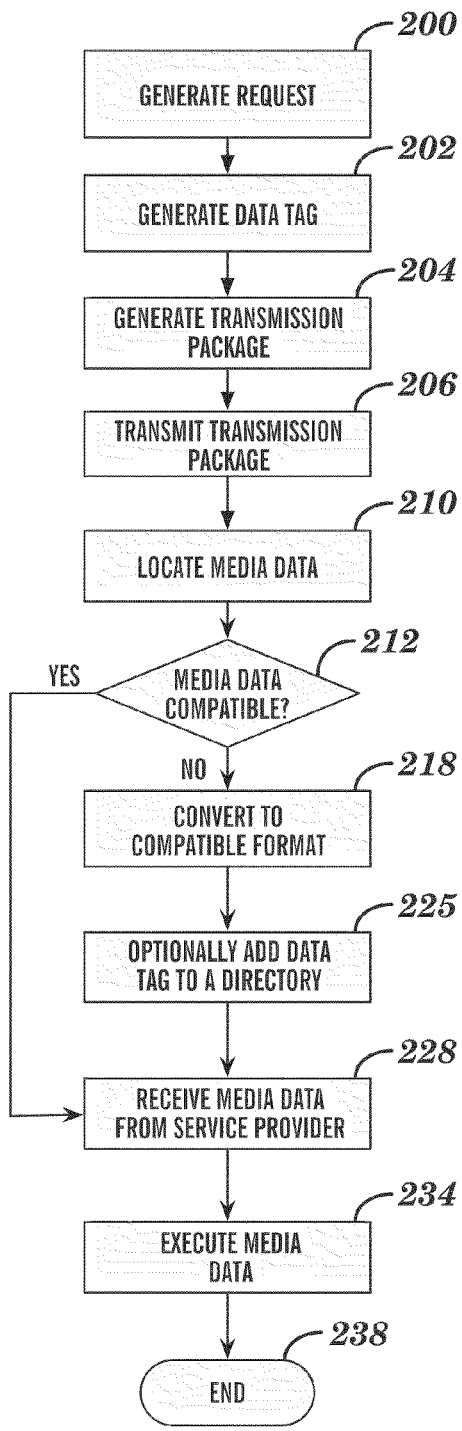
FIG. 2 illustrates a flowchart describing an algorithm used by the system of FIG. 1 for executing a pull based model with respect to identifying characteristics of a media device, in accordance with embodiments of the present invention.

FIG. 2 illustrates a flowchart describing an algorithm used by system 5 of FIG. 1 for executing a pull based model with respect to identifying characteristics of a media device, in accordance with embodiments of the present invention. In step 200, a device (e.g., one of devices 8a . . . 8d of FIG. 1) generates a request for media data. In step 202, the device generates a globally unique data tag. The globally unique data tag specifies capabilities of the device. The capabilities of the device may comprise any type of hardware or software capabilities including, inter alia, memory capabilities, media data format capabilities, processing speed capabilities, etc. In step 204, the device generates a transmission package comprising the request and the globally unique data tag. In step 206, the device transmits the transmission package to a service provider (e.g., computing system 10 of FIG. 1). The service provider determines if the media data is compatible with the capabilities of the device based on comparing the globally unique data tag to a media tag describing meta data associated with the media data. In step 210, the service provider locates the requested media data (i.e., if the service provider determines that the media data is compatible with the capabilities of the device based on the globally unique data tag and the meta data associated with said media data). The data may be retrieved internally (i.e., from the service provider systems) or externally (i.e., external to the service provider systems). In step 212, it is determined (based on comparing the globally unique data tag to the media tag associated with the meta data) if the retrieved media data is compatible with the requesting device.

If in step 212, it is determined that the retrieved media data is not compatible with the requesting device then in step 218, a search is performed to locate an appropriate service for converting the media data to a compatible format and the media data is converted to a compatible format (e.g., by locating an appropriate service to perform the conversion to a compatible format and performing the conversion). Alternatively, the service provider may retrieve alternative media data comprising a compatible format. In step 225, the service provider optionally adds the globally unique data tag to a directory comprising a plurality of globally unique data tags associated with a plurality of media devices. In step 228, the device receives (i.e., from the service provider) executable media data (i.e., the media data comprising a compatible format). In step 234, the device executes (i.e., for a user) the executable media data and the process is terminated in step 238.

If in step 212, it is determined that the retrieved media data is compatible with the requesting device then in step 228, the device receives (i.e., from the service provider) executable media data (i.e., the media data comprising a compatible format). In step 234, the device executes (i.e., for a user) the executable media data and the process is terminated in step 238.

Figure 3:
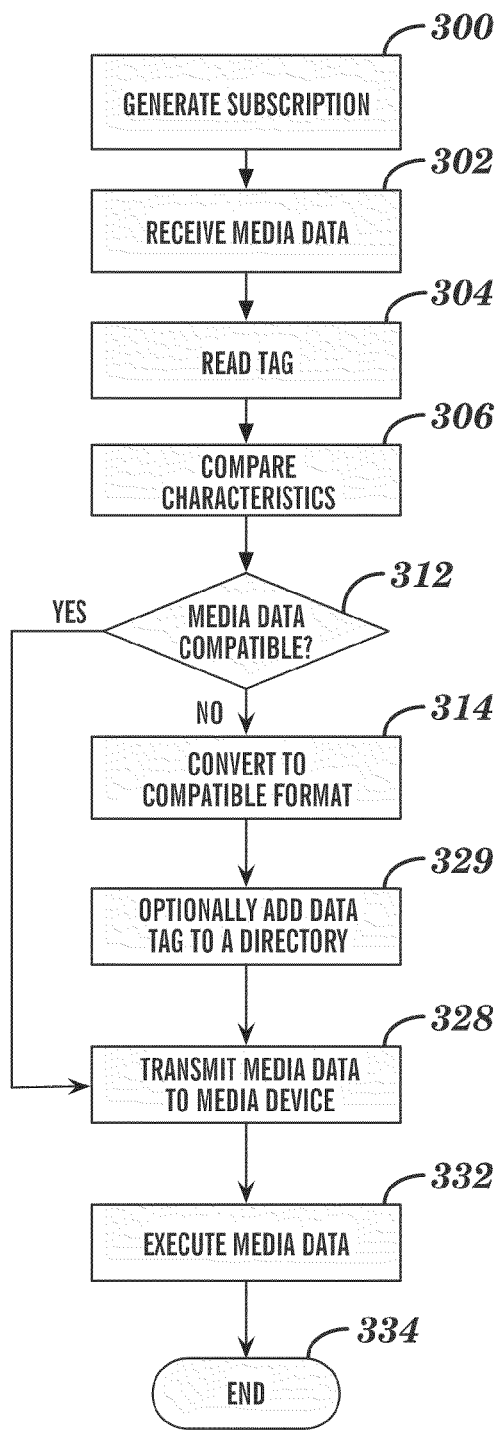
FIG. 3 illustrates a flowchart describing an algorithm used by the system of FIG. 1 for executing a push based model with respect to identifying characteristics of media data, in accordance with embodiments of the present invention.

FIG. 3 illustrates a flowchart describing an algorithm used by system 5 of FIG. 1 for executing a push based model with respect to identifying characteristics of a media device, in accordance with embodiments of the present invention. In step 300, a service provider controller device (e.g., computing system 10 of FIG. 1) generates a subscription to a content repository (e.g., media database 12c of FIG. 1). The subscription is associated with a media device (e.g., one of media devices 8a . . . 8d of FIG. 1) belonging to a user and a topic of interest associated with the user. In step 302, the service provider controller device automatically receives media data (e.g., audio and/or video data) associated with the subscription. The media data comprises a globally unique media tag (i.e., generated by a plug-in component residing in a media repository) associated with metadata specifying characteristics of the media data. In step 304, the service provider controller device reads the globally unique media tag. In step 306, the service provider controller device compares (i.e., in response to reading the globally unique media tag associated with the metadata) the characteristics of the media data to a data tag describing characteristics of the media device. In step 312, it is determined (based on comparing the globally unique media tag to the data tag) if the media data is compatible with the media device.

If in step 312, it is determined that the media data is not compatible with the media device then in step 314, a search is performed to locate an appropriate service for converting the media data to a compatible format and the media data is converted to a compatible format (e.g., by locating an appropriate service to perform the conversion to a compatible format and performing the conversion). Alternatively, the service provider may retrieve alternative media data comprising a compatible format. In step 325, the service provider adds the globally unique data tag to a directory comprising a plurality of globally unique data tags associated with a plurality of media devices. In step 328, the service provider controller device transmits (i.e., pushes) executable media data (i.e., the media data comprising a compatible format) to the media device. In step 332, the media device executes (i.e., for the user) the executable media data and the process is terminated in step 334.

If in step 312, it is determined that the media data is compatible with the media device then in step 328, the service provider controller device transmits (i.e., pushes) executable media data (i.e., the media data comprising a compatible format) to the media device. In step 332, the media device executes (i.e., for the user) the executable media data and the process is terminated in step 334.

Figure 4:
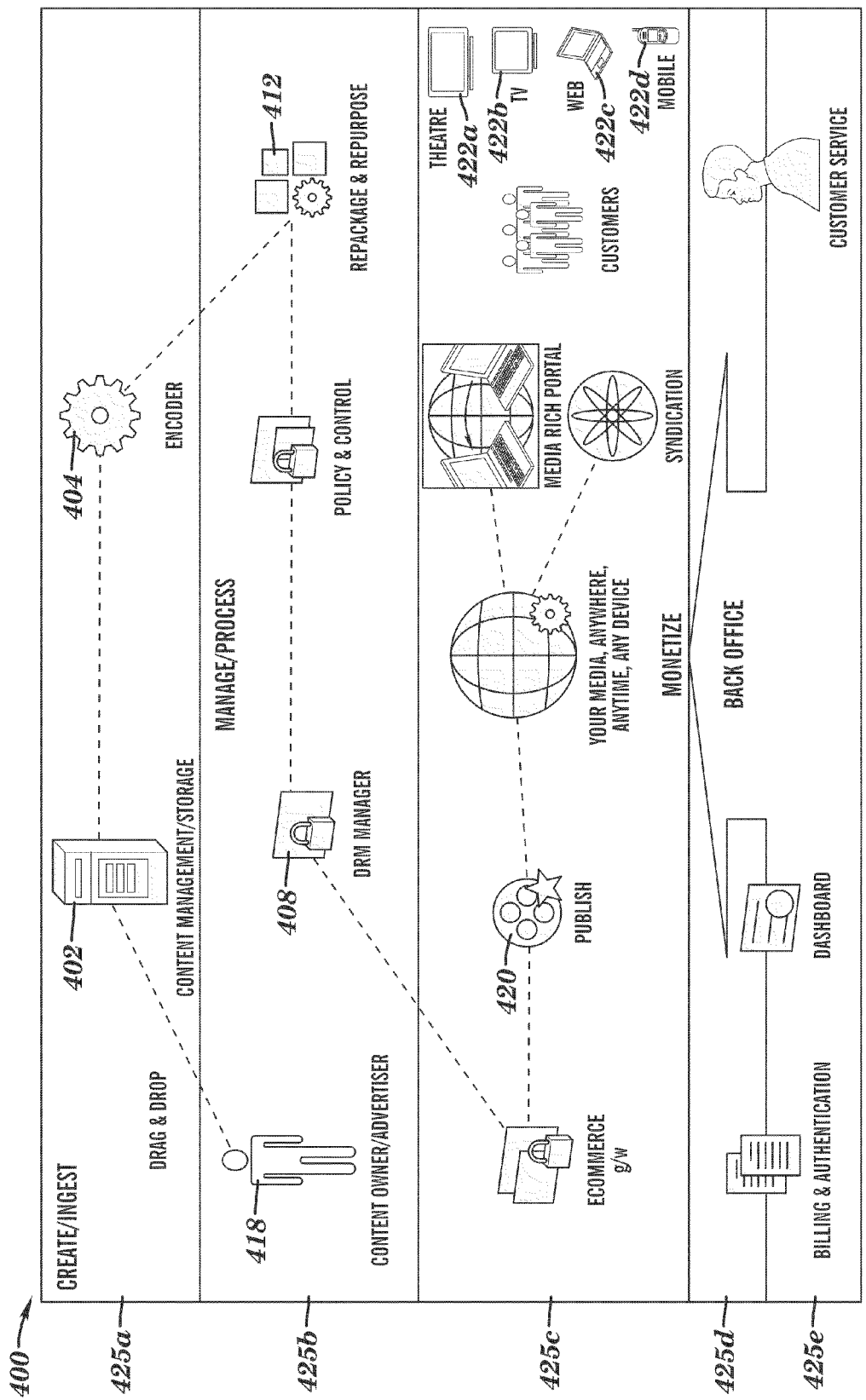
FIG. 4 illustrates a system describing an implementation example for the executing system of FIG. 1 for identifying characteristics of a media device, in accordance with embodiments of the present invention.

FIG. 4 illustrates a system 400 describing an implementation example for executing system 5 of FIG. 1 for identifying characteristics of a media device, in accordance with embodiments of the present invention. System 400 depicts a real life content monetization workflow. In system 400, focal points comprise content management/storage 402, encoder 404, DRM (digital rights management) manager 408, package and repurpose 412, and publish 420. Channels such as TV 422b, Web 422c, mobile 422d, and theatre 422a comprise consumable points or devices. Intelligent multimedia tag plug-ins are placed within the consumable points or devices in order to generate the globally unique data tags. System 400 comprises a layered architecture (i.e., layers 425a . . . 425d) for content monetization workflow. In system 400, digital content is produced by a content owner 418 (e.g., a content owner may comprise movie producers, digital news producers, a person sharing a video/picture on any community/social network, etc). The raw digital content may not be consumed in its original format. The raw digital content must be processed based on how and where the digital content will be consumed. Therefore, the raw digital content will go through content lifecycle processing. The first stage in the content lifecycle processing comprises content ingestion 425*a*. Processing digital media comprises the first stage. The processing includes encoding content from analog form to digital form and storing the digital form in a temporary repository. Since the encoded content may come from different sources, the format may differ. The repository only accepts a certain format and therefore requires a transformation of the content from a source format to a target format. A decision to transform the format of the content is based on the globally unique data tags. The stored digital content/item is then further processed based on channel and device capability on which the content is to be consumed. The different channels and devices are depicted in the third layer (i.e., monetize 425*c*). System 400 comprises content processing engines such as, encoder/transcoder, repurposing, and watermarking. Transcoders are used for converting content from one format to another. There may be multiple transcoders (e.g., an array of transcoders) each one specialized for operating on set of formats. Similarly, there may be multiple content processing engines (e.g., watermarking engines, data movers, packaging etc) each one specialized to execute operations on a set of formats. Selecting an appropriate content processing engine is performed by a controller based on metadata of a content payload, a context, and a contract based on policies. These controllers will become the focal points.

Figure 5:
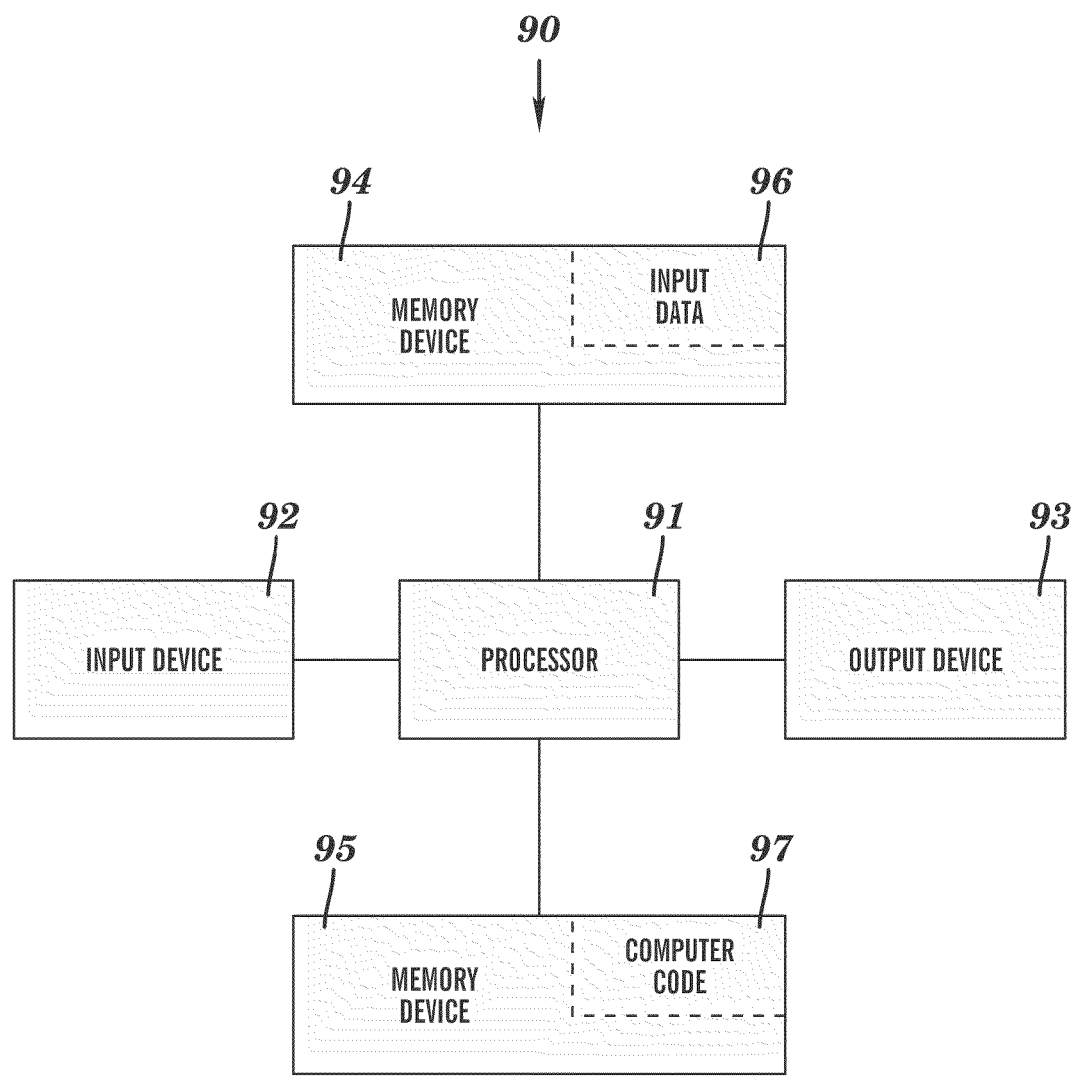
FIG. 5 illustrates a computer apparatus used for generating a multimedia tag for identifying characteristics of a media device, in accordance with embodiments of the present invention.

FIG. 5 illustrates a computer apparatus 90 (e.g., computing system 10 of FIG. 1) used for tagging metadata associated with media data and tagging devices to determine capability matches between various devices and the media data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for tagging metadata associated with media data and tagging devices to determine capability matches between various devices and the media data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to tag metadata associated with media data and tag devices to determine capability matches between various devices and the media data. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for tagging metadata associated with media data and tagging devices to determine capability matches between various devices and the media data. In another embodiment, the invention provides a method that performs the process steps of the invention on a subscription, advertising, and/or fee basis. That is, a service provider, such as a Solution Integrator, could offer to tag metadata associated with media data and tag devices to determine capability matches between various devices and the media data and to tag SOA based services. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

generating, by a device, a request for media data;

generating, by said device, a globally unique data tag specifying hardware and software capabilities of said device;

generating, by said device, a transmission package comprising said request and said globally unique data tag;

transmitting, by said device to a service provider, said transmission package, wherein said service provider enables a controller device comprising a memory unit storing a media mapping and adaptation table that includes device tags, media tags, URL tags, adapted media tags, adaptation service tags, and additional device tags, wherein said service provider determines that said media data is not compatible with said hardware and software capabilities of said device based on comparing said globally unique data tag to a media tag of said media tags and a URL tag of said URL tags, wherein said media tag and said URL tag describe meta data associated with said media data, wherein said media data comprises a first format differing from an original format comprised by said media data, wherein a search is performed within said mapping and adaptation table for an adaptation service tag of said adaptation service tags to locate an appropriate service for converting the media data to a compatible format, wherein the media data is converted to executable media data comprising said compatible format, and wherein said executable media data is tagged with an adapted media tag of said adapted media tags;

receiving, by said device from said service provider, said executable media data comprising a specified form of said media data, wherein said executable media data is generated based on results of said comparing said globally unique data tag to said media tag of said media tags and said URL tag of said URL tags; and executing, by said device for a user, said executable media data.

2. The method of claim 1, wherein said service provider determines that additional media data is compatible with said capabilities of said device.

3. The method of claim 1, wherein said capabilities of said device comprise hardware or software capabilities associated with said device.

4. The method of claim 1, further comprising:
generating and adding, by said device, said globally unique data tag to a directory comprising a plurality of globally unique data tags associated with a plurality of media devices and media.

5. The method of claim 1, wherein said globally unique data tag couples said service provider and said user.

6. The method of claim 1, wherein said generating said globally unique data tag comprises generating fine grained attributes and combinations associated with said device and said media data.

7. A process for supporting computer infrastructure, said process comprising providing at least one support service for at least one of creating, integrating, hosting, maintaining, and deploying computer-readable code in said computer system comprising a computer processor, wherein the code upon being executed by said computer processor is capable of performing the method of claim 1.

8. A computer program product, comprising a computer storage medium comprising a computer readable program code embodied therein, said computer readable program code configured to perform the method of claim 1 upon being executed by a processor of said computing system.

9. A computing system comprising a processor coupled to a computer-readable memory unit, said memory unit comprising a computer readable code configured to be executed by the processor to perform the method of claim 1.

10. A method comprising:
generating, by a service provider controller device, a subscription to a content repository, wherein said subscription is associated with a means for connecting to said content repository, wherein said subscription is associated with a media device belonging to a user and a topic of interest associated with said user, and wherein said service provider controller device comprises a memory unit storing a media mapping and adaptation table that includes device tags, media tags, URL tags, adapted media tags, adaptation service tags, and additional device tags;

automatically receiving, by said service provider controller device, media data associated with said subscription, wherein said media data comprises a globally unique media tag of said media tags and a URL tag of said URL tags associated with metadata specifying characteristics of said media data;

reading, by said service provider controller device, said globally unique media tag and said URL tag;

comparing, by said service provider controller device in response to said reading, said globally unique media tag and said URL tag to a data tag specifying hardware and software capabilities of said media device;

determining, by said service provider controller device in response to said comparing, that said characteristics of said media data are not compatible with said capabilities of said media device;

searching, within said mapping and adaptation table by said service provider controller device, for an adaptation service tag of said adaptation service tags, wherein said adaptation service tag is associated with an appropriate service for converting the media data to a compatible format;

locating, by said service provider controller device in response to said results of said searching, said appropriate service;

converting, by said service provider controller device, said media data into executable media data, wherein said executable media data comprises said compatible format differing from an original format comprised by said media data;

tagging, by said service provider controller device, said executable media data with an adapted media tag of said adapted media tags; and transmitting, by said service provider controller device to said media device, said executable media data comprising a specified form of said media data.

11. The method of claim 10, wherein results of said determining indicate that additional characteristics of additional media data are compatible with additional capabilities of said media device.

12. The method of claim 10, wherein said capabilities of said device comprise hardware or software capabilities associated with said device.

13. The method of claim 10, further comprising:
generating and adding, by said service provider controller device, said globally unique data tag to a directory comprising a plurality of globally unique data tags associated with a plurality of media devices and media.

14. The method of claim 10, wherein said globally unique data tag couples a service provider associated with said service provider controller device to said user.

15. The method of claim 10, wherein said globally unique data tag comprises comprises fine grained attributes and combinations associated with said media device and said media data.

16. A process for supporting computer infrastructure, said process comprising providing at least one support service for at least one of creating, integrating, hosting, maintaining, and deploying computer-readable code in said computer system, wherein the upon being executed by said computer processor is capable of performing the method of claim 10.

17. A computer program product, comprising a computer storage medium comprising a computer readable program code embodied therein, said computer readable program code configured to perform the method of claim 10 upon being executed by a processor of said computing system.

18. A computing system comprising a processor coupled to a computer-readable memory unit, said memory unit comprising a computer readable code configured to be executed by the processor to perform the method of claim 10.

* * * * *